(12) United States Patent
Beardsley

(10) Patent No.: US 7,711,182 B2
(45) Date of Patent: May 4, 2010

(54) METHOD AND SYSTEM FOR SENSING 3D SHAPES OF OBJECTS WITH SPECULAR AND HYBRID SPECULAR-DIFFUSE SURFACES

(75) Inventor: Paul A. Beardsley, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 945 days.

(21) Appl. No.: 11/497,962

(22) Filed: Aug. 1, 2006

(65) Prior Publication Data
US 2008/0030744 A1 Feb. 7, 2008

(51) Int. Cl.
*G06K 9/46* (2006.01)
(52) U.S. Cl. .................. 382/154; 382/203; 356/612
(58) Field of Classification Search .............. 382/154, 382/203; 356/601, 602, 603, 609, 612
See application file for complete search history.

(56) References Cited

U.S. PATENT DOCUMENTS

| | | | |
|---|---|---|---|
| 5,568,258 A | 10/1996 | Uemura et al. | |
| 6,590,669 B1 * | 7/2003 | Wagner | 356/601 |
| 2004/0246497 A1 | 12/2004 | Chambard et al. | 356/612 |
| 2005/0238237 A1 * | 10/2005 | Haeusler et al. | 382/203 |
| 2006/0050284 A1 * | 3/2006 | Bertin-Mourot et al. | 356/612 |

FOREIGN PATENT DOCUMENTS

DE 10127304 A1 * 12/2002

OTHER PUBLICATIONS

Kiyasu et al. "Measurement of the 3-D Shape of Specular Polyhedrons Using an M-Array Coded Light Source." IEEE Transactions on Instrumentation and Measurement, vol. 44, No. 3, Jun. 1995, pp. 775-778.*
English Translation of DE 10127304 A1 to Petz et al., pp. 1-23.*
Kutulakos et al.: "A Theory of Refractive and Specular 3D Shape by Light-Path Triangulation.", Jan. 2008.
A. Blake, "Geometry from Specularity," Proc ICCV, 1988.
T.Bonfort et al, "General Specular Surface Triangulation," Proc ACCV, 2006.

* cited by examiner

*Primary Examiner*—Jon Chang
(74) *Attorney, Agent, or Firm*—Dirk Brinkman; Gene Vinokur

(57) ABSTRACT

Surface normals and other 3D shape descriptors are determined for a specular or hybrid specular-diffuse object. A camera records an image of a smoothly spatially-varying pattern being reflected in the surface of the object, with the pattern placed at an initial position. The camera then records multiple images of the pattern undergoing a sequence of subsequent displacements to a final position distinct from the initial position. For a pixel in the images, the pattern displacement that corresponds to the minimum difference between the pixel value in the initial image and any of the final images is determined. The incident ray that strikes the surface of the object at the point being imaged by the pixel is then determined using the determined pattern displacement. The surface normal at that same surface point is then determined using the determined incident ray. Other 3D shape descriptors are determined from the surface normals of the object, such as principal curvatures, or the principal axes of a parametric surface, or the 3D shape, or the object pose.

26 Claims, 6 Drawing Sheets

100

200

METHOD AND SYSTEM FOR SENSING 3D SHAPES OF OBJECTS WITH SPECULAR AND HYBRID SPECULAR-DIFFUSE SURFACES

FIELD OF THE INVENTION

The invention relates generally to computer vision, and more particularly to sensing 3D shapes of objects with specular and hybrid specular-diffuse surfaces.

BACKGROUND OF THE INVENTION

Sensing Surfaces

Sensors that acquire 3D data are useful for many applications. For example, a system for automated 'bin-picking' in a factory can acquire 3D data as a precursor to determining poses of objects in a bin. Then, a robot arm can be directed to retrieve a selected one of the objects. The pose of an object is its 3D location and 3D orientation at the location.

One set of vision-based techniques for sensing 3D shape of surfaces assumes that the objects have non-specular surfaces, such as matte surfaces. Another set of techniques assumes that the objects have specular surfaces, such as mirror surfaces or transparent surfaces.

Non-Specular Surfaces

Computer vision-based techniques for sensing 3D shape of non-specular surfaces include structured light, time-of-flight laser scanners, stereo cameras, moving cameras, photometric stereo, shape-from-shading, and depth-from-(de)focus.

Those techniques all assume that incident light on the surface is reflected diffusely, and hence, reflected light is visible at any sensor with line-of-sight to the surface. Furthermore, many of the techniques assume that visible features are physical features with a measurable 3D physical location, and not reflected features. The techniques degrade as the surface becomes less diffuse and more specular, because the above assumptions are no longer true.

Specular Surfaces

Computer vision-based techniques for sensing 3D shape of specular surfaces assume that there are features in a surrounding scene that are reflected by the specular surface. The features may be sparse, such as specular highlights arising from point light sources in the scene, as in A. Blake and G. Brelstaff, "Geometry from specularity," Proc ICCV, 1988. If the features are sparse, then the sensed 3D shape of the surface is also sparse. This is undesirable for many applications. For example, it is difficult to compute a reliable pose of an object when the sensed features are sparse. The problem can be ameliorated by moving the camera or features relative to the surface, but this is time-consuming.

The features can be dense, such as a dense binary-coded pattern, as in T.Bonfort et al, "General Specular Surface Triangulation," Proc ACCV, 2006. However, there is a problem in using a dense binary-coded pattern of dense individual features when sensing varied surface shapes. The reflection of dense features in a planar specular surface such as a flat mirror is not distorted, while the reflection of the features in a curved specular surface such as a spoon can be severely distorted. If the dense features are a suitable size to be visible in a planar reflecting surface, then the same features are typically too small to discern in most of the curved reflecting surface. If the dense features are a suitable size to be visible in the curved reflecting surface, then the same features are too large to provide fine resolution measurements of a planar surface.

A second problem with using a dense binary-coded pattern is that the pattern is made by displaying a succession of images on a screen. If the binary-coding has 8-bits for example, then eight images must be displayed. If the pattern must be displayed twice, as in the method described by Bonfort referenced above, then 16 images must be displayed. This is time-consuming.

A third problem with using a dense binary-coded pattern arises when a camera pixel (or group of pixels) records the reflection of a single feature of the pattern. The recorded feature is used to determine one 3D measurement on the surface. But there is no way to assign a sub-pixel accuracy pixel position to this 3D measurement. Instead, an arbitrary decision must be made, such as assigning the center of the camera pixel (or center of a group of pixels) to the 3D measurement. This is undesirable because accuracy is lost at the measurement stage.

The method described by Bonfort et al. attempts to deal with this problem by smoothing the 3D measurements in a subsequent smoothing stage. However, this is inferior to obtaining sub-pixel accuracy pixel positions at the measurement stage, because the smoothing can eliminate important details of the surface 3D shape.

Hybrid Surfaces

There are few vision-based sensors known in the art for objects with hybrid specular-diffuse surfaces, such as brushed metal, where the surface reflects some of the incident light in a specular way, and some of the light in a diffuse way. This is because such a surface does not give a strong enough diffuse response for techniques that work with non-specular surfaces, and the surface also does not give a strong enough specular reflection for techniques that work with specular surfaces. For example, the method described by Bonfort et al. fails when the reflections of adjacent binary-coded features are blurred into each other due to the diffuse reflection component. Therefore, the binary-coded pattern cannot be determined.

Thus, there is a need for a method and system for sensing specular surfaces that performs well on both planar and curved surfaces. There is also a need for a system that is fast because the pattern that it uses is not composed of a large temporal sequence of images. There is also a need for a method and system that associates camera pixel positions with sub-pixel accuracy to the determined 3D measurements. And, there is a need for a method and system for sensing specular surfaces that can cope with the presence of a diffuse component in the surface reflectance.

SUMMARY OF THE INVENTION

Embodiments of the invention provide a method and system for sensing a 3D shape of objects with specular and hybrid specular-diffuse surfaces.

A camera acquires an image of a planar screen reflected by the specular or hybrid specular-diffuse surface of the object, and the screen shows a smoothly spatially-varying pattern. For example, the pattern is displayed or projected on the screen.

The screen is moved in a controlled way from an initial first position through subsequent positions to a final position in a direction that is orthogonal to the plane of the screen.

The camera acquires multiple images of the screen reflected by the specular or hybrid specular-diffuse surface of the object, with the screen at the final position, and the screen showing the pattern undergoing a sequence of lateral displacements.

For each pixel, the displacement of the pattern, corresponding to a minimum difference between the pixel value in the initial image and any of the final images, is recorded.

For each pixel, the pattern displacement is used in conjunction with a known system calibration to determine a surface normal of the point on the surface of the object imaged by that pixel.

The determined surface normals are used to derive other geometric characteristics of the surface, such as principal curvature at each point, principal axes of a parametric object, 3D shape via use of a phase-unwrapping method, and object pose.

DETAILED DESCRIPTION OF THE PREFERRED EMBODIMENT

System Structure

Figure 1:
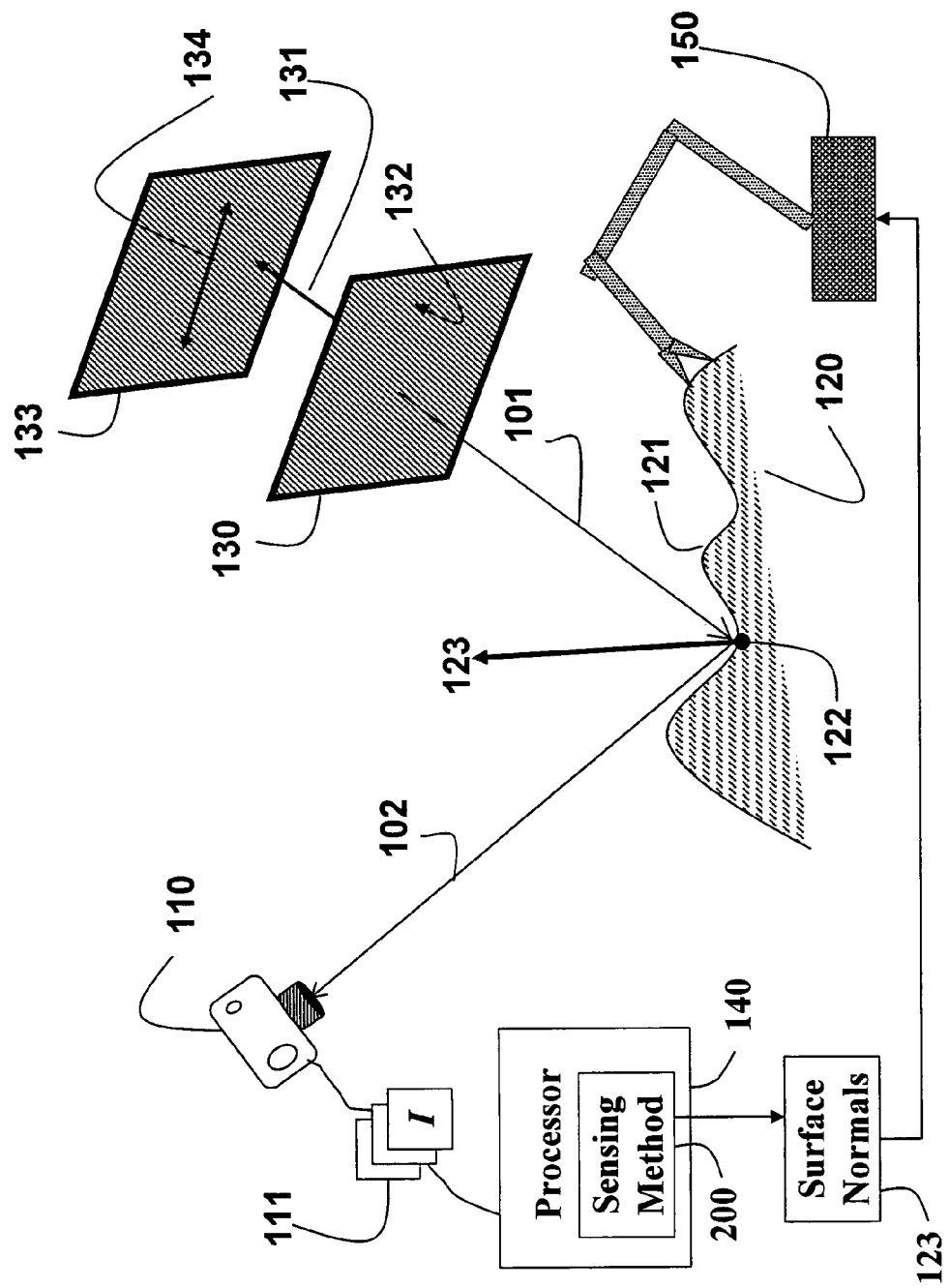
FIG. 1 is a schematic of a system for determining a shape of a surface of an object according to an embodiment of the invention.

FIG. 1 shows a system 100 for sensing surface normals of reflective objects according to an embodiment of the invention. The system includes a camera 110, an object 120, a movable planar screen 130, showing a smoothly spatially-varying pattern 132, and a processor 140 connected to the camera 110.

The camera acquires input image (I) 111 of a surface 121 of the object 120. As a characteristic, the surface 121 is specular or hybrid specular-diffuse. The pattern 132 is reflected by the surface 121. An image is acquired with the screen at an initial position 130. The screen is moved by a controlled amount 131 through subsequent positions to a final position 133 such that the plane of the screen at the different positions remains parallel to the screen when it was at the initial position. Images are acquired with the screen at the final position 133 and the pattern being displaced through a range of subsequent positions 134 on the screen. In this case, the displacement is in a plane parallel to the screen.

A camera pixel records the light arriving from incident ray 101 and reflected ray 102 reflected by surface point 122 as an image value (intensity). At the point 122 the surface 121 has surface normal 123. It is desired to determine the surface normal 123 that is indicative of the shape of the object.

The pattern 132 can be printed on the screen, or the pattern can be displayed on the screen using front or rear illumination. The processor 140 includes a memory and I/O ports as are known in the art. The processor is capable of executing a sensing method 200 according to the embodiments of the invention. Outputs of the processor are the surface normals 123. The surface normals are indicative of the shape of the surface of the object. The surface normals can be used by other systems, for example, a robotic arm 150, to manipulate the object.

Method Operation

Figure 2:
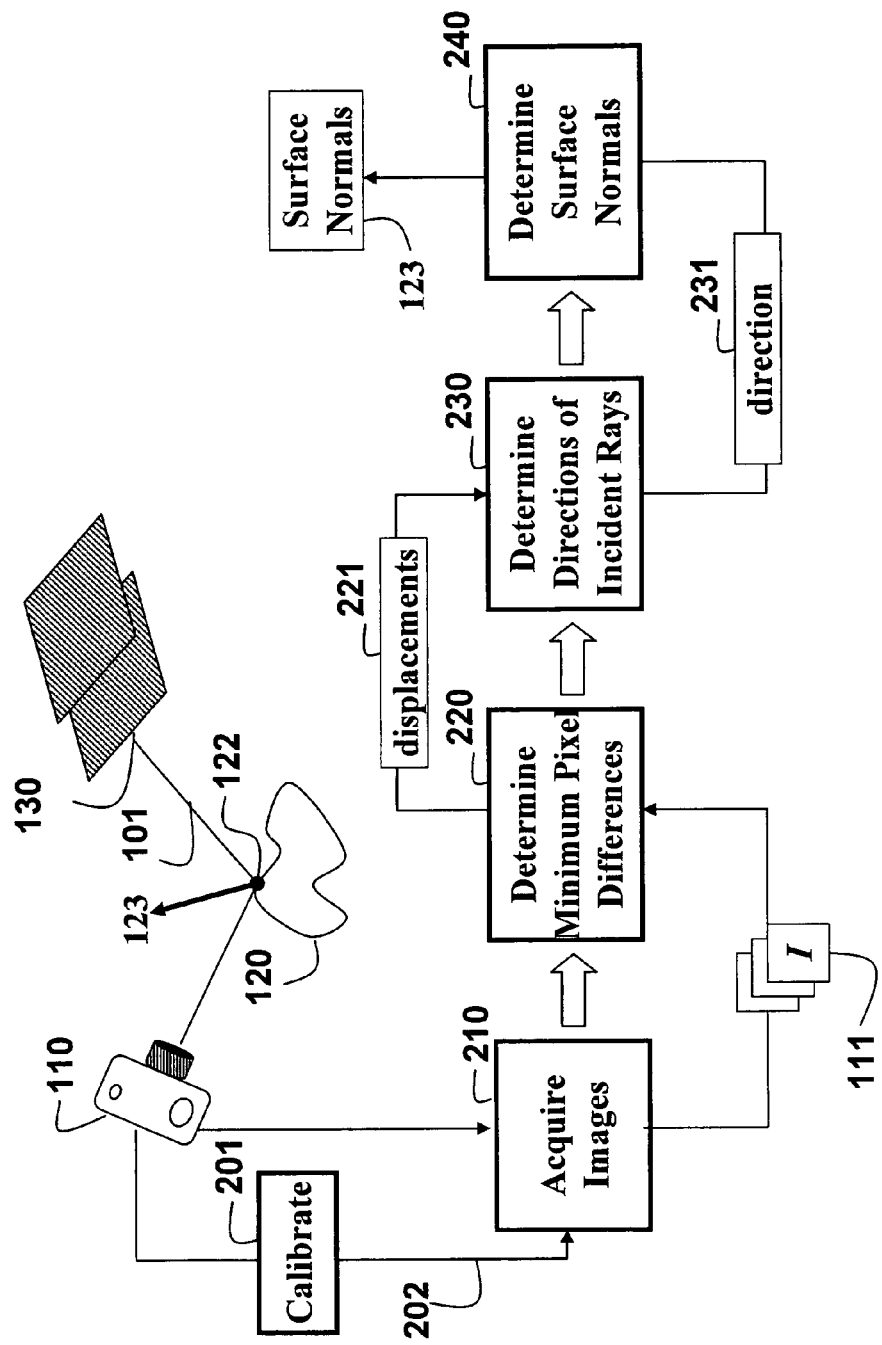
FIG. 2 is a flow diagram of a method for determining a shape of a surface of an object according to an embodiment of the invention.

FIG. 2 shows the steps of the method 200 for sensing surface normals of reflective objects according to one embodiment of the invention. A preliminary step calibrates 201 the system to produce calibration data 202. The calibration is performed one time.

The camera 110 acquires 210 the images 111 of the screen 130 as reflected by the surface of the object 120. The screen has an initial position, subsequent positions, and a final position. The camera acquires one image of the screen at the initial position, and multiple images of the screen at the final position for a range of displacements of the pattern on the screen. For each pixel in each image, the method determines 220 the minimum difference between the pixel image value in the initial image and subsequent image values for any of the final images, and records the associated displacement 221 of the pattern.

For each pixel in each image, determine 230 a direction 231 of the incident ray 101 from the pattern to a point 122 on the surface of the object using the displacement 221. For each pixel in each image, determine 240 an orientation of the surface normal 123 of the point 122, using the incident ray 101. The surface normal 123 is indicative of a shape of the object at the point 122.

Detailed Operation

Calibration

Figure 3:
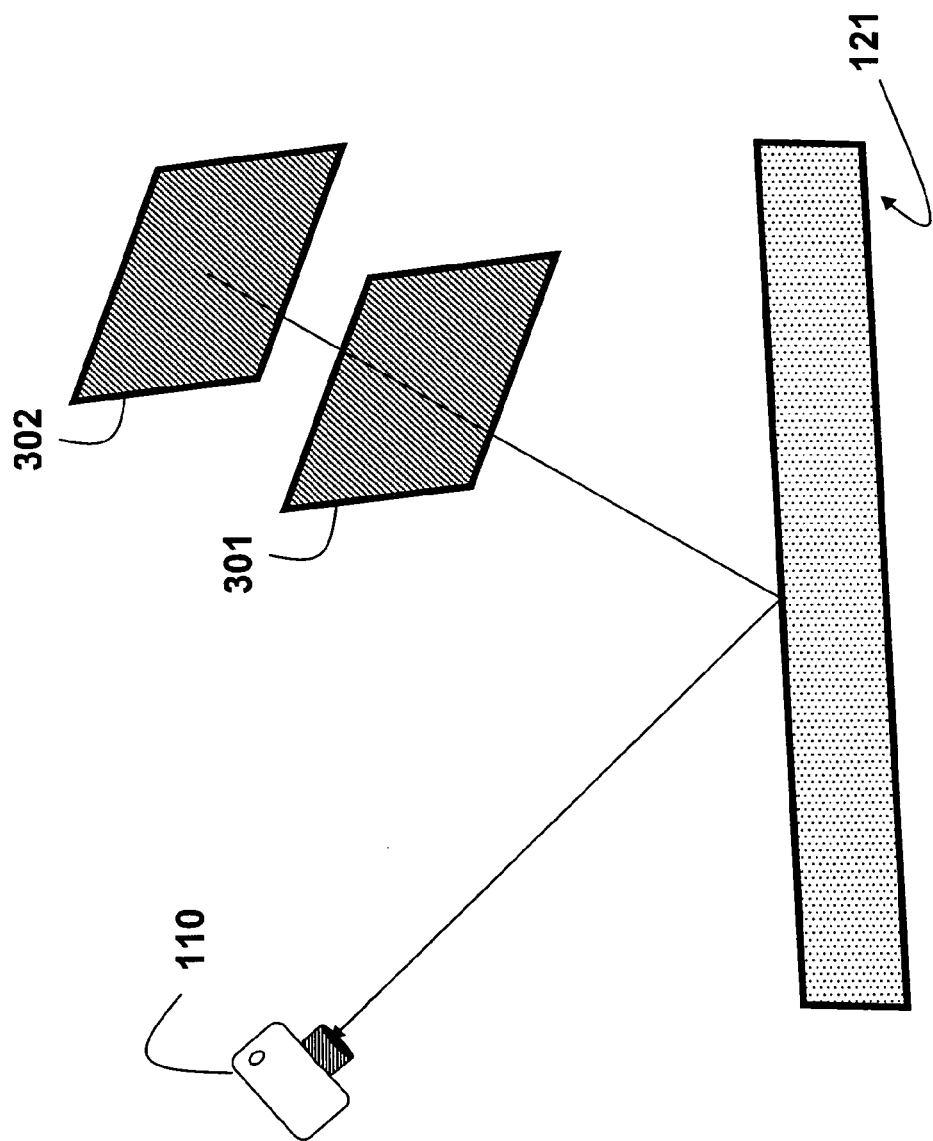
FIG. 3 is a schematic of the system calibration.

As shown on FIG. 3, a first stage of calibration determines the intrinsic parameters of the camera. A second stage determines the physical position of the camera and the screen for initial position 301 and final position 302. This stage requires that the input images include at least three features at known locations on the screen e.g. three of the four corner points of the screen.

If the screen is not directly visible by the camera, then the screen can be viewed via a planar mirror. The mirror is marked with at least three points in known position. This calibration involves determining the position of the mirror, determining a virtual position of the screen as the screen appears in the mirror, and then inferring the physical position of the screen.

A third stage of the calibration determines a horizontal and vertical direction of the screen. This operation requires at least one line in the horizontal direction on the screen, and the vertical direction can then be inferred.

A fourth stage of calibration determines a size of displacements that the pattern undergoes as the pattern is displaced on the screen. This operation requires that the camera views the pattern undergoing at least one displacement on the screen.

Sensing

Figure 4:
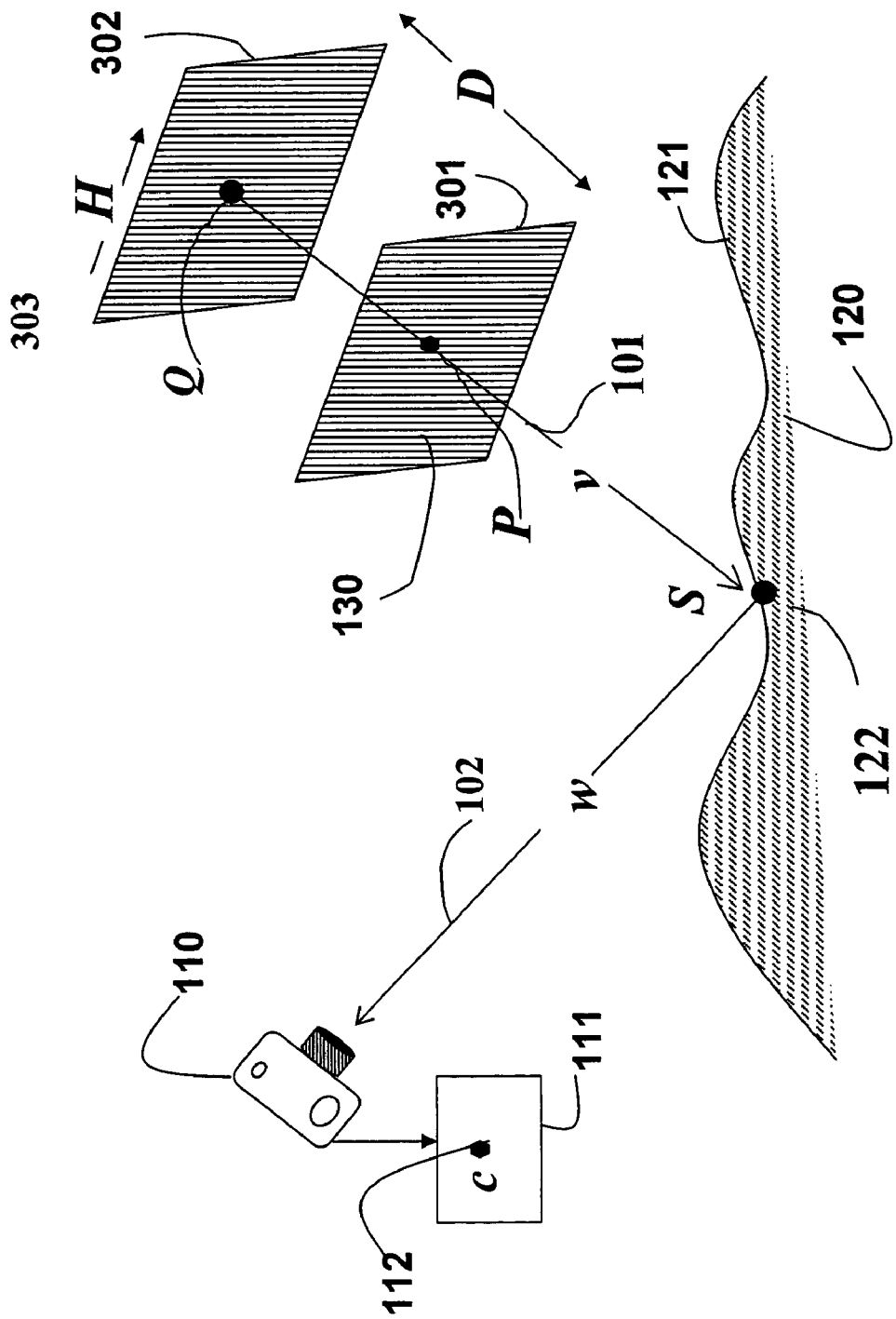
FIG. 4 is a schematic indicating the measurements made by the system.

FIG. 4 shows the image 111 with a pixel c 122 that corresponds to a feature P in the pattern reflected by the 3D ray v 101 and the 3D ray w 102 at the surface point S 122. The pattern is a smoothly spatially-varying 1D pattern, e.g., an intensity ramp or multiple color spectrum ramps, varying along the horizontal direction on a screen 130. The pixel value (intensity or color) at pixel c is p. In this figure, the pixels c in the image 111 directly correspond to the pixels of the sensor of the camera 110. Therefore, the pixels can be called camera pixels.

The screen is translated along its normal by a distance D from the initial position 301, through subsequent positions, to the final position 302, and the camera pixel c now corresponds to feature Q in the pattern.

The pattern on the screen is moved through a range of horizontal displacements 303 i.e., in a plane parallel to the screen. The pixel values at camera pixel c for the sequence of displacements are denoted $q_i$, i=1, ..., n.

Figure 5:
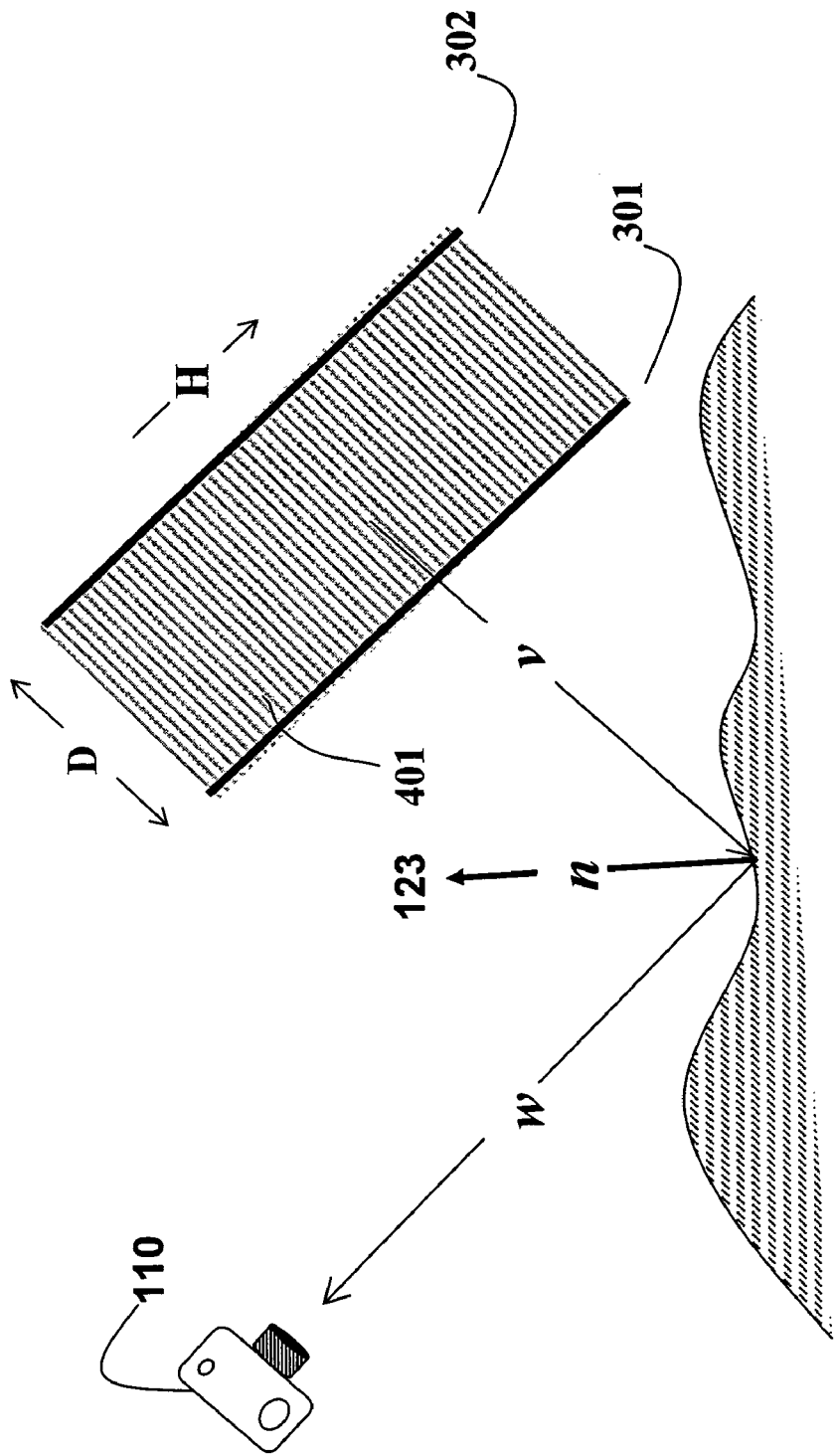
FIG. 5 is a schematic of a set of planes that correspond to an intermediate result for determining a surface normal.

A horizontal displacement H of the pattern corresponding to a minimum value of $p-q_i$ is determined. If D and H for a camera pixel c are known, then it is possible to determine a set of parallel planes 401, as shown in a vertical view in FIG. 5. Any given plane in this set is defined by two lines, the first is a line of the pattern in the initial position, and the second is a line of the pattern in the final position, with a lateral displacement of H. One plane in this set of planes contains the incident ray v that goes from pattern feature P (or Q) to the surface point S 122, and reflects to the camera pixel c.

The process is repeated with the 1D pattern rotated on the screen so that the pattern varies along a vertical direction instead of the horizontal direction, and the displacement of the pattern at the final position is vertical instead of horizontal. If the pixel values at camera pixel c for the sequence of pattern displacements at the final position are denoted $r_i$, i=1, . . . , n, then the vertical displacement V of the pattern corresponding to a minimum value of $p-r_i$ is determined. And then a second set of parallel planes is obtained, distinct from the first, one of which contains the incident ray that goes from feature P (or Q) to the surface point S 122 and reflects to the camera pixel c.

An intersection of any member of the first set of planes with any member of the second set of planes yields a 3D ray v=(m×n) of the incident ray 101, where m is a normal for the first set of planes, and n is a normal for the second set of planes, and 'x' indicates the cross-product operator. Note that 3D ray v specifies a direction only, and is not at a known position in 3D space. The 3D ray v 101 specifies the direction from feature P (or Q) to the surface point S 122, which reflects to the camera pixel c.

The 3D ray w 102 in FIG. 1 for camera pixel c can be obtained from the camera calibration data 202. Given the directions v and w, the normal 123 to the surface at point S is $n=(v_u+w_u)/2$, where $v_u$ is the unit vector corresponding to the direction v, and $w_u$ is the unit vector for the direction w.

The computation of H, via the computation of the minimum of $p-q_i$ can be modified, so that it is not necessary to move the pattern through a large range of displacements. H can be computed from just two values of $q_i$ (and their associated $H_i$) by a linear interpolation or extrapolation from the values of $q_i$. Given more than two values of $q_i$ a better function approximation can be used, such as a quadratic, to produce a better estimate of H. Similarly for V.

Other Embodiments

In another embodiment, pixels whose values do not change in any of the images are ignored because they do not correspond to reflections of the pattern. For example, the pixels are in the surrounding background of the scene.

In other embodiments, the pattern can be a fixed design on the screen, or a pattern that is projected on the screen.

In another embodiment, the sensing is done using a single pattern instead of two patterns. The pattern has a unique value at each point. For example, the pattern is a color pattern with a red intensity ramp in the horizontal direction and a green ramp in the vertical direction, and the pattern is displaced in a diagonal direction with the screen at the final position. And the final images are used to compute p–q and p–r and do subsequent computations as before.

In another embodiment, the pattern repeats periodically on the screen. To avoid the occurrence of multiple minima in p–q or p–r, the translation of the screen is small enough that the parts of the pattern that reflect to a given pixel in the initial and final images all lie within a single period of the periodic pattern.

In another embodiment, the pattern is displaced on the screen at the initial position as well as at the final position, and the multiple initial and final images are all used to determine the surface shape.

In another embodiment, the screen is moved to two or more subsequent positions after the initial position, and the steps are repeated for each subsequent position. For a pixel in the images, the incident ray to the surface is now computed by combining the rays computed at each individual position, to provide a more accurate estimate.

In another embodiment, the surface normals are used to estimate the principal curvatures at each point on the object.

In another embodiment, the surface normals are used to determine the principal axes of a parametric object such as a cylinder or sphere.

In another embodiment, the surface normals are input to a phase-unwrapping method to determine the 3D shape of the object. Phase-unwrapping is well known in the art.

In another embodiment, the surface normals are used to determine the 3D shape of the object followed by the pose of the object.

In another embodiment, the variation in the surface normals across an area of the surface is used to analyze the surface. The variations in the surface normals are used to identify discontinuities in the surface shape, such as edges between surface faces, or raised or indented parts of the surface. The variation in surface normal is also used to characterize the smoothness of the surface. The variation in surface normal is also used to identify principal curvatures and, for a parametric object, characteristics such as principal axes. The variation in surface normal is also used to characterize anisotropic properties of the surface, such as directional texture on brushed metal, because surface normal vary least along the direction of the brushed texture and vary most in the direction perpendicular to the brushed texture. Discontinuities in the surface normals can also be used to identify discontinuities in the reflection on the surface, such as those that occur when some of the reflection comes directly from the pattern and some of the reflection comes from double reflections of the pattern via other specular surfaces.

In another embodiment, the variation in the difference in pixel value between the initial image and each of the multiple final images is used to characterize anisotropic properties of the surface, such as directional texture on brushed metal.

In another embodiment, the screen is composed of multiple planar facets, so that more parts of the surface of the object reflect the pattern.

In another embodiment, two or more cameras are used to view the surface of the object, so that more parts of the surface can be processed.

In another embodiment, a zoom camera is used to view the surface of the object, so that higher-resolution results are available for the zoomed area.

In another embodiment, the moving screen is replaced by two fixed screens and a beam splitter, to provide the same effective configuration but with no moving parts.

In another embodiment, the presence of multiple minima in p–q or p–r is used to identify the occurrence of multiple layers on the surface of the object.

Effect of the Invention

The method is invariant to the response characteristics of the camera 110, to the ambient illumination, to reflectance characteristics of the surface 121, to imperfections or dirt on the surface 121, and to the absolute appearance of the pattern on the screen 130, because the method is based only on the difference in pixel value p–q, and not on any pre-calibration or expected characteristic of the camera, the ambient illumination, the surface material, or the pattern on the screen.

The method works on planar or curved surfaces without the need to tune the form of the pattern, because the method is based only on the difference in pixel value p–q, and is not affected by scale differences or distortions of the reflected pattern arising from reflection in different shaped surfaces.

The method works with a minimum of six images for the pattern in the case when two distinct patterns (horizontal and vertical) are shown. That is, one image at the initial screen position, and two images (for a displacement of the pattern) at the final screen position. The method works with a minimum of three images when one pattern, e.g., a color pattern with a red intensity ramp along the horizontal direction, and a green intensity ramp along the vertical direction, is shown.

The method enables, for a pixel in the images, multiple values of the difference in pixel value p–q to be combined to determine a more accurate estimate of the minimum in p–q, and hence a more accurate estimate of the associated surface normal.

Figure 6:
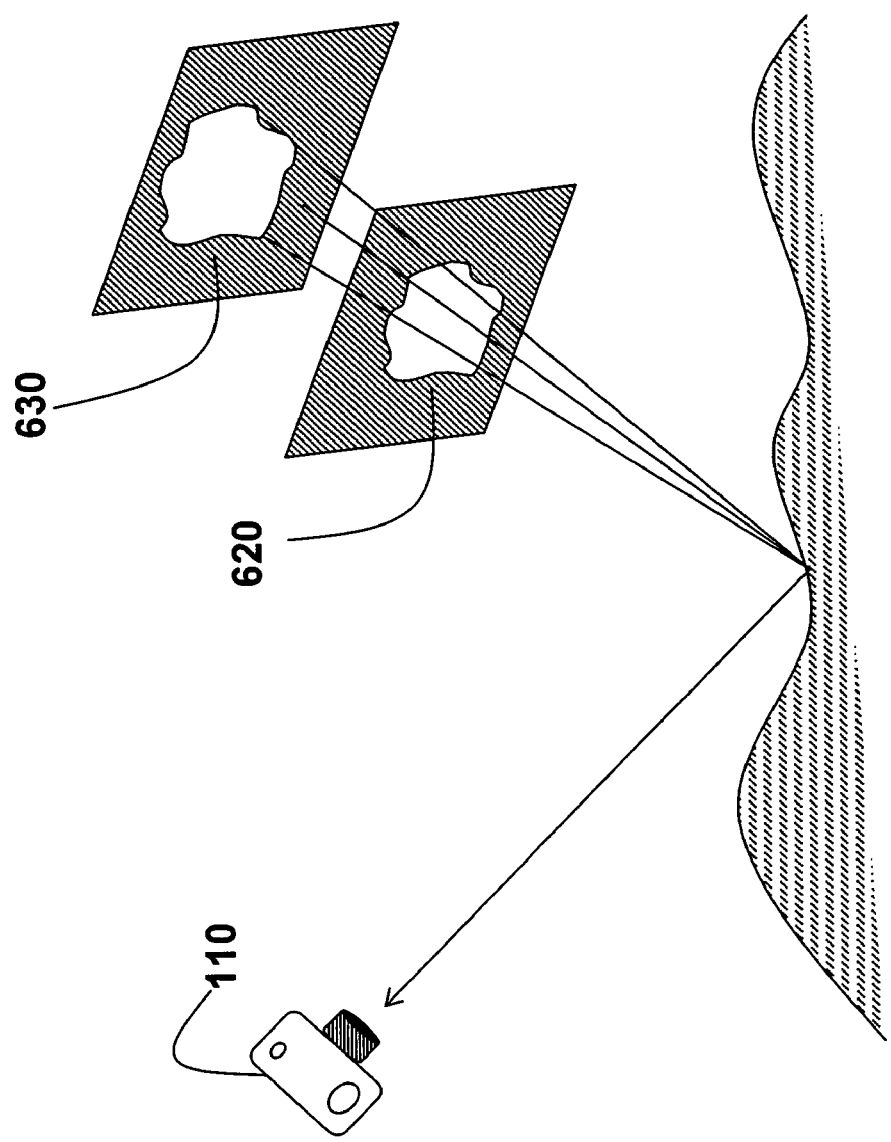
FIG. 6 is a schematic indicating the effect of using the system with a hybrid specular-diffuse surface.

The method works both on specular surfaces and hybrid specular-diffuse surfaces. When the surface is specular, the light that arrives at a camera pixel is the reflection from a single point on the pattern. But when the surface is hybrid specular-diffuse, the light that arrives at a camera pixel is the result of specular and diffuse reflection from an area of the pattern. The area is 620 in FIG. 6 when the screen is at an initial position, and area 630 when the screen is at a final position. The method is based only on a difference in pixel value p–q, with pixel value p corresponding to the reflection of area 620 and pixel value q corresponding to the reflection of area 630, so it avoids any requirement to explicitly model this complicated reflection.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for sensing a shape of a surface of a reflective object, comprising the steps of:
    recording an initial image value for a surface point on the object, when the surface is reflecting a visible item in an initial position;
    recording subsequent image values as the visible item undergoes a predetermined motion, through subsequent positions that are distinct from the initial position;
    identifying the position of the visible item at which the image value for the surface point becomes substantially identical to the initial image value; and
    determining a surface normal of the surface point using the initial and the identified position of the visible item, wherein the steps of the method are performed in a processor.

2. The method of claim 1, in which the visible item is a planar screen showing a spatially-varying pattern, and further comprising the steps of:
    acquiring an initial image of the screen being reflected in the surface of the object, with the screen at the initial position;
    moving the screen according to the predetermined motion to the final position parallel to the initial position;
    acquiring final images of the screen being reflected in the surface of the object, with the screen at the final position and with the pattern undergoing a sequence of displacements on the screen;
    determining, for a pixel in the images, a minimum difference between a pixel value in the initial image and any of the final images, and recording the associated displacement of the pattern;
    determining, for the pixel from the displacements of the displacement, a direction of an incident ray from the pattern to the surface of the object at the point being imaged by the pixel; and
    determining for a pixel, from its determined incident ray, the surface normal of the object at the point being imaged by the pixel, the surface normal representing a shape of the surface at the surface point.

3. The method of claim 1, wherein the surface normals are used to determine 3D properties of the surface, selected from the group consisting of principal curvatures, principal axes of a parametric surface, 3D shape, and object pose.

4. The method of claim 1, wherein the image values are only recorded for parts of the object reflecting the visible item.

5. The method of claim 1, wherein the visible item is an object with an imprinted pattern.

6. The method of claim 1, wherein the visible item is an object with a projected pattern.

7. The method of claim 1 wherein the visible item is an object with a pattern that is a 1D intensity ramp.

8. The method of claim 7, wherein the 1D intensity ramp includes multiple color ramps.

9. The method of claim 2, wherein the steps are performed two times, the first time using a 1D pattern varying along a horizontal direction of the screen only and the pattern displacement is horizontal, and the second time using a 1D pattern varying vertically only and the pattern displacement is vertical, and the results are combined to obtain the surface normal.

10. The method of claim 2, wherein the number of images of the pattern that is captured is three, one image at the initial screen position, and two images at the final screen position, and the displacement of the pattern that would give minimum difference in pixel value between the initial and final images is determined by linear interpolation.

11. The method of claim 2, wherein the number of images of the pattern that is captured is more than three, one image at the initial screen position, and the other the images at the final screen position, and the displacement of the pattern that gives the minimum difference in the pixel value between the initial and final images is determined by a higher-order method of interpolation.

12. The method of claim 2, wherein the pattern repeats periodically on the screen, and a period is large enough that points of the pattern that reflect to a given pixel in the initial and final images lie within a single period of the periodic pattern.

13. The method of claim 2, wherein the pattern is displaced on the screen at the initial position as well as at the final position, and multiple initial images and multiple final images are used to determine the shape of the surface.

14. The method of claim 1, wherein a variation in the surface normals across a part of the surface is used to characterize a property of the surface.

15. The method of claim 14, wherein the variation in the surface normals is used to identify a physical discontinuity in the surface.

16. The method of claim 14, wherein the variation in the surface normals is used to identify principal curvatures at each surface point and, for a parametric surface, axes of symmetry.

17. The method of claim 14, wherein the variation in the surface normals is used to identify a raised bas-relief design.

18. The method of claim 14, wherein the variation in the surface normals is used to characterize a smoothness of the surface.

19. The method of claim 14, wherein the variation in the surface normals is used to characterize anisotropy of the surface.

20. The method of claim 14, wherein the variation in the surface normals is used to identify a discontinuity in the reflection on the surface.

21. The method of claim 1, wherein a variation in the image values is used to characterize a property of the surface.

22. The method of claim 21, wherein the variation is used to characterize anisotropy of the surface.

23. The method of claim 1, wherein the visible item is composed of multiple planar facets.

24. The method of claim 1, wherein two or more cameras are used to view the object.

25. The method of claim 1, wherein a zoom camera is used to view the object.

26. A system for sensing a shape of a surface of a reflective object, system comprising:
- means for recording an initial image value for a surface point on the object, when the surface is reflecting a visible item in an initial position;
- means for recording subsequent image values as the visible item undergoes a predetermined motion, through subsequent positions that are distinct from the initial position;
- means for identifying the position of the visible item at which the image value for the surface point becomes substantially identical to the initial image value; and
- means for determining a surface normal of the surface point using the initial and the identified position of the visible item.

* * * * *